United States Patent [19]

Sterns

[11] Patent Number: 4,578,652

[45] Date of Patent: Mar. 25, 1986

[54] BROADBAND FOUR-PORT TEM MODE 180° PRINTED CIRCUIT MICROWAVE HYBRID

[75] Inventor: William G. Sterns, Canoga Park, Calif.

[73] Assignee: ITT Corporation, New York, N.Y.

[21] Appl. No.: 609,614

[22] Filed: May 14, 1984

[51] Int. Cl.$^4$ .............................................. H01P 5/19
[52] U.S. Cl. ..................................... 333/117; 333/120; 333/121; 333/204
[58] Field of Search ................ 333/116, 117, 120, 121, 333/128, 204; 455/327

[56] References Cited

U.S. PATENT DOCUMENTS

| | | | |
|---|---|---|---|
| 3,229,233 | 1/1966 | Pon | 333/120 |
| 3,530,407 | 9/1970 | Blight | 333/121 |
| 3,742,392 | 6/1973 | Schwarzmann | 333/128 |
| 4,323,855 | 4/1982 | Gerlach | 333/128 X |
| 4,420,839 | 12/1983 | Hogerheiden, Jr. | 333/120 X |

Primary Examiner—Paul Gensler
Attorney, Agent, or Firm—T. L. Peterson; J. S. Christopher

[57] ABSTRACT

A broadband TEM mode four-port hybrid in a single-level microwave circuit in a transmission line medium selected from among the stripline, microstrip, airstrip, etc. media. The device employs coupled strip all-pass filter elements to provide a hybrid wherein isolation to the cross ports, power division to the coupled ports, and the 0° and 180° output phase relationships are independent of frequency over substantial frequency bandwidths.

22 Claims, 5 Drawing Figures

BROADBAND FOUR-PORT TEM MODE 180° PRINTED CIRCUIT MICROWAVE HYBRID

BACKGROUND OF THE INVENTION

1. Field of the Invention

The invention relates to microwave radio frequency transmission line circuits generally, and more specifically to four-port hybrids instrumented in stripline, microstrip, and the like.

2. Description of the Prior Art

The so-called hybrid is per se well known and well understood in this art in its waveguide, coaxial and stripline forms. These devices serve as power-dividing, summing, and differencing networks and are widely used in microwave systems. In the text *Radar Handbook* by Merrill I. Skolnik (McGraw-Hill Book Company 1970), the general class of devices called "microwave junctions" (which includes the so-called hybrid) is described in its prior art forms.

Immediately before that description, the Skolnik handbook discusses stripline and microstrip transmission lines, and it is in media of that type that the invention to be described hereinafter has been implemented. Other technical references describe the stripline, microstrip and similar transmission lines structures, such as *Antenna Engineering Handbook,* Henry Jasik, editor, McGraw-Hill 1961 (First Edition).

A basic element employed in the combination of the invention is described as an "all-pass filter" in the paper "Coupled-Strip-Transmission-Line Filters and Directional Couplers" by E. M. T. Jones and J. T. Bolljahn (*IRE Transactions on Microwave Theory and Techniques,* April 1956). In that paper, the basic design criteria for various coupled-strip configurations are given in physical dimension and impedance relationships. The so-called "all-pass" filter included in the Jones and Bolljahn description will be recognized as an inherently broadband device.

In a technical paper by B. M. Schiffman ("Transactions on Microwave Theory and Techniques"—IEEE April 1958), an application of the coupled-strip elements to produce a 90° phase shifter is described.

The typical prior art hybrid is in the 1½ wavelength hybrid ring, as shown in FIG. 16 (page 8-17) of the aforementioned *Radar Handbook,* that form being adapted for instrumentation in stripline or microstrip. This prior art hybrid ring is effective for narrow frequency bandwidths, or in applications wherein variations with frequency is isolation, power division, and phase characteristics can be tolerated, although its geometry inherently makes it less compact and less convenient for inclusion in microwave circuitry than that according to the invention hereinafter described.

A prior copending United States Patent Application by the same inventor entitled "Broad-Band Printed-Circuit Balun," Ser. No. 443,419, filed Nov. 22, 1982, now U.S. Pat. No. 4,460,877 issued July 17, 1984, discloses a printed circuit balun which, like the herein described hybrid, is implementable in stripline, microstrip, or the like. The aforementioned balun invention also makes use of coupled-strip, all-pass, printed circuit filter sections as described by Jones et al. and Schiffman (identified hereinbefore). That patent application is assigned to the assignee of this application and the inventorship is the same. The disclosure of that application (Ser. No. 443,419) is incorporated herein by reference.

The manner in which the invention advances the state of this art will be evident as this description proceeds.

SUMMARY OF THE INVENTION

The invention is a novel four-port TEM mode 180° hybrid circuit employing at least two all-pass filter sections designed with their connecting traces to give a desired unequal power division. It may be said to have been the general objective of the invention to provide a broadband, low-loss, inexpensive form of microwave circuit hybrid basically equivalent to the well known waveguide magic tee in strip-transmission-line or microstrip medium.

In a typical embodiment, in stripline, a pattern of printed circuit conductors on the dielectric substrate is mounted generally symmetrically between a pair of ground planes. The conductive traces seen on the supporting dielectric substrate are all applied conventionally.

Two forms of the hybrid according to the invention are shown and described. Bacically, it may be said that in both embodiments, the coupled-strip all-pass filters in predetermined lengths are located in the circuit such that the side ports maintain a mutual 180° phase difference with respect to the difference port and 0° phase difference with respect to the sum port. The coupled-strip all-pass filter sections exhibit a nearly linear phase shift versus frequency over a wide band and the placement of these coupled-strip elements is such as to produce a nearly constant net relative phase condition at the side ports.

The most significant features of the hybrid according to the invention and the corresponding improvements achieved over existing designs include:

1. Cross port isolation almost independent of frequency over substantial frequency bandwidths.
2. Constant power division over substantial frequency bandwiths.
3. Non-dispersive (constant) phase characteristics over substantial frequency bandwidths.
4. Single level center conductor.
5. Smaller size and more convenient geometry as compared to the common 1½ wavelength hybrid ring.

The details of the two embodiments shown and described will be understood from the description hereinafter.

DETAILED DESCRIPTION

Figure 1:
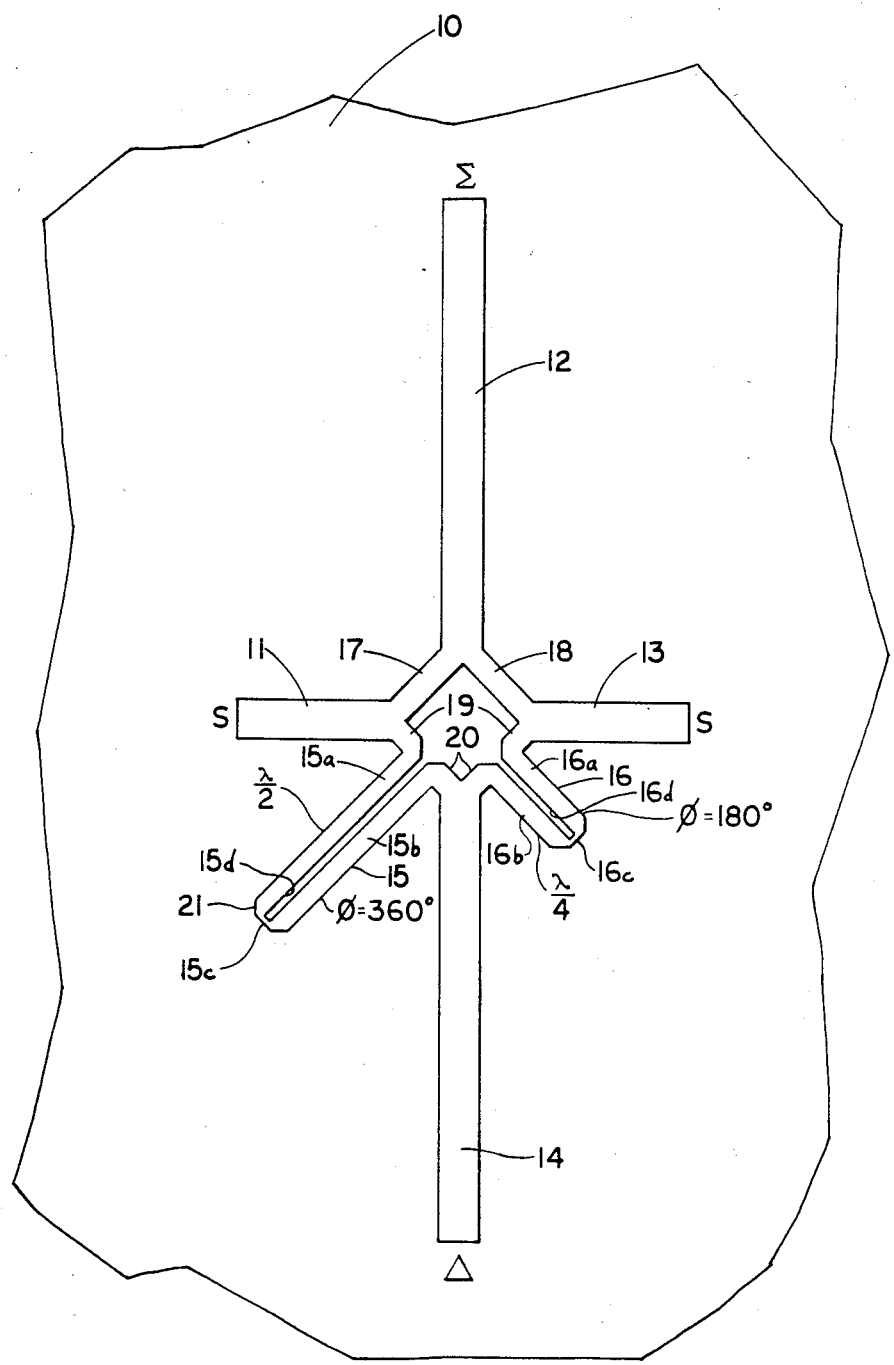
FIG. 1 is a first form of the printed circuit layout for a hybrid according to the invention.

Referring now to FIG. 1, the first embodiment of the hybrid according to the invention is shown with the printed circuit traces on a conventional dielectric substrate 10. In all embodiments described, the nature of this dielectric substrate is essentially the same, and suitable low-loss materials are well known to those of skill in this art.

It will be noted that the characteristic impedance of the transmission line sections represented by the traces on substrate 10 (and for that matter on substrate 10a in FIG. 2) are equal in magnitude. The factors and parameters determining these characteristics impedances are well known in this art. Most importantly, the width of the conductive trace is mathematically related to the effective characteristic impedance of a given conductive trace. It should also be noted that interconnecting traces branching from other traces are designed to match impedances at the points of joinder. For example, the traces 17 and 18 together present an impedance at their junction with 12 which constitutes a match. Similarly, the stub traces 19 and 20 are similarly impedance matched for the same reason. The inside edges of traces 17, 18, 19, and 20 form the outline of a quadrilateral having sides of an odd number of quarter wavelengths. Typical impedances for these various conductive traces are as follows:

| CONDUCTIVE TRACE | IMPEDANCE (OHMS) |
| --- | --- |
| 11 | 50 |
| 12 | 50 |
| 13 | 50 |
| 14 | 50 |
| 17 | 70.7 |
| 18 | 70.7 |

In the configuration of FIG. 1, the conductive trace 12 is identified as the sum port, trace number 14 is identified as a difference port and 11 and 13 are the two side ports. The function as viewed externally is the same as any prior art four-port TEM hybrid. The two coupled-stirp all-pass filters 15 and 16 are one half wavelength and one quarter wavelength respectively and are each shorted at their ends 15c and 16c.

A typical implementation of the device of FIG. 1 at microwave "C" band produces coupled-strip filter dimensions, for a dielectric constant of 2.2, as follows. For coupled-strip 15 overall length measured from the center line of 19 or 20 to shorted end 15c is about 0.69 inches.

The widths of 15a, 15b, 16a and 16b are each about 0.060 inches. The center slots 15d and 16d are each approximately 0.010 inches in width. The overall length of coupled strip filter section 16 measured from the center line of 19 or 20 to shorted end 16c is about 0.35 inches.

The insertion phase of filter section 15 is 360° at midband and the insertion phase for 16 at midband is 180°. As previously indicated, the corresponding insertion phases are substantially a linear function of frequency and track each other at frequencies on either side of the design center frequency. In this way, ports 11 and 13 maintain 180° phase difference between them when the hybrid is fed from the difference port 14. With respect to the sum port 12, the side ports 11 and 13 are mutually in phase.

Figure 2:
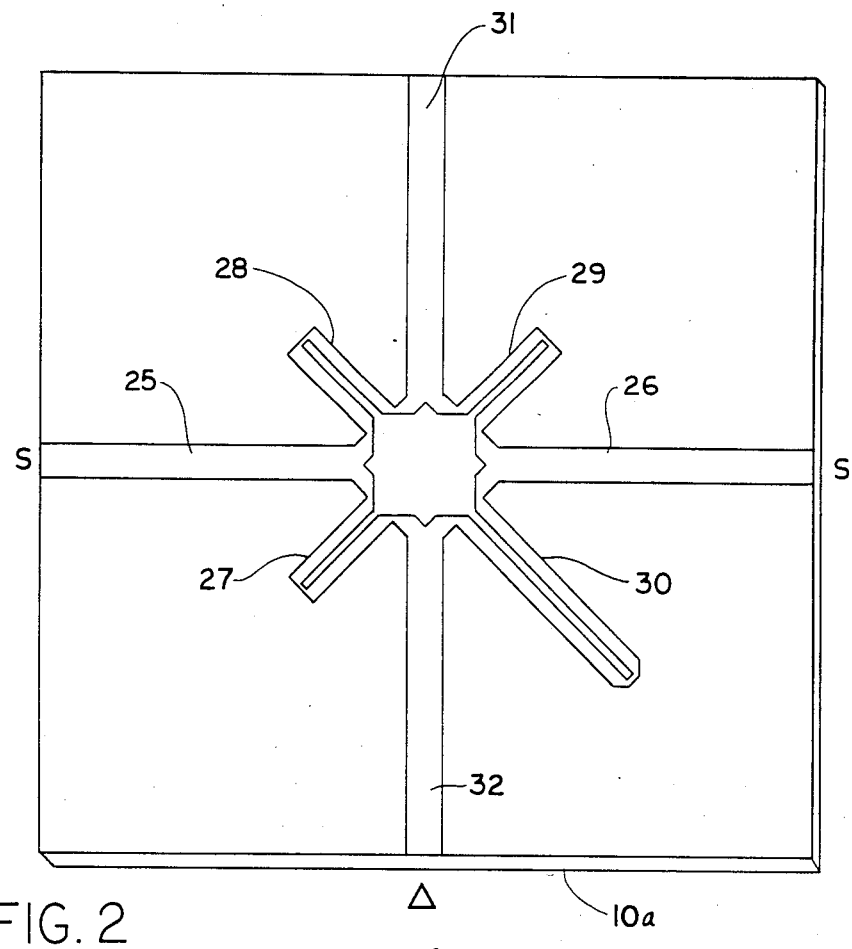
FIG. 2 depicts the layout of the conductive traces in a second and preferred embodiment providing greater network symmetry.

Referring now to FIG. 2, the more symmetrical network of the preferred embodiment affords isolation between the side ports 25 and 26 substantially independently of frequency. In this embodiment, three ¼ wave coupled-strip filter sections 27, 28 and 29 are employed and one ½ wave coupled-strip section 30 is included as shown. The same conductive trace impedance considerations and coupled-strip filter section design apply as set forth in connection with FIG. 1. In performance terms, the side ports 25 and 26 exhibit a substantially fixed 180° phase relationship over the broad band of response. The coupled-strip filter sections 27 and 30 correspond to 16 and 15, respectively, from FIG. 1 and provide the same functions; however, the symmetry achieved in FIG. 2 produces superior performance. Coupled-strip filter sections 28 and 29 essentially balance each other when considering the maintenance of the 180° relationship between side ports 25 and 26 (feed from difference port 32), while providing high constant side port isolation not achieved in the configuration of FIG. 1. The inside edges of the stub traces of filter sections 27, 28, 29, and 30 form the outline of a quadrilateral having sides of an odd number of quarter wavelengths.

Figure 3:
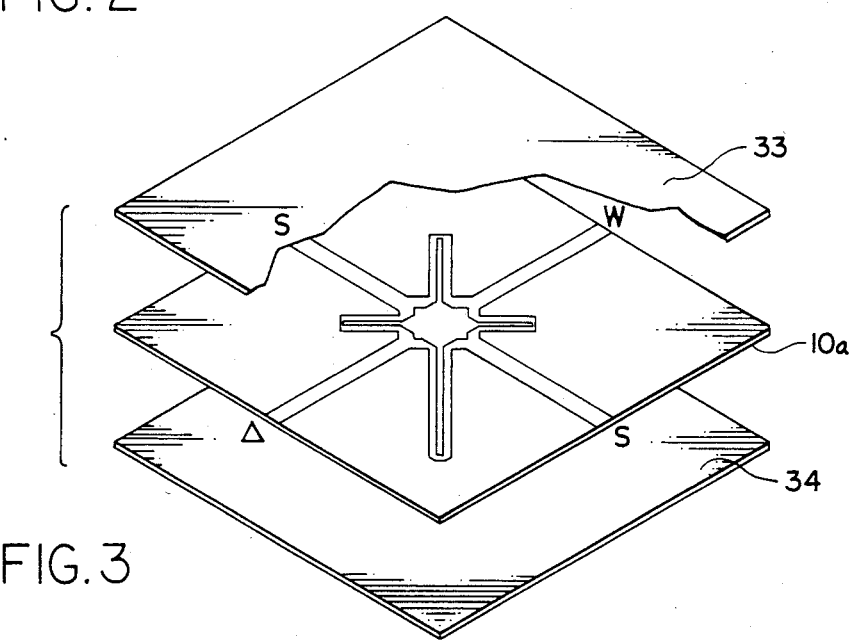
FIG. 3 is a pictorial in exploded and partial cutaway form illustrating the placement of the substrate and traces of FIG. 2 between ground planes in a stripline configuration.

Referring now to FIG. 3, the arrangement of FIG. 2 is shown suspended between conductive ground planes 33 and 34 in the operative form according to stripline technology.

Figure 4:
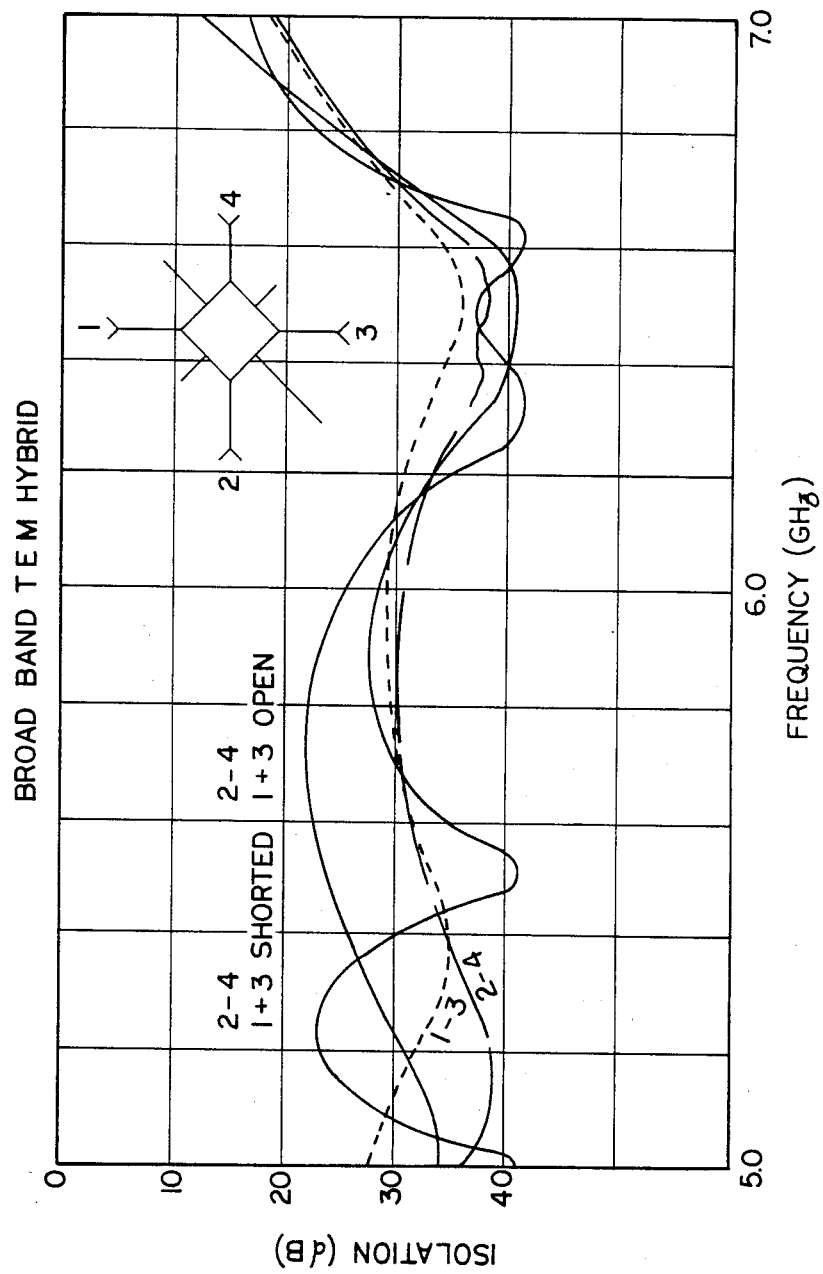
FIGS. 4 and 5 are the achieved performance of a broadband TEM mode hybrid at C-band frequencies taken on the embodiment of FIG. 2.
Figure 5:
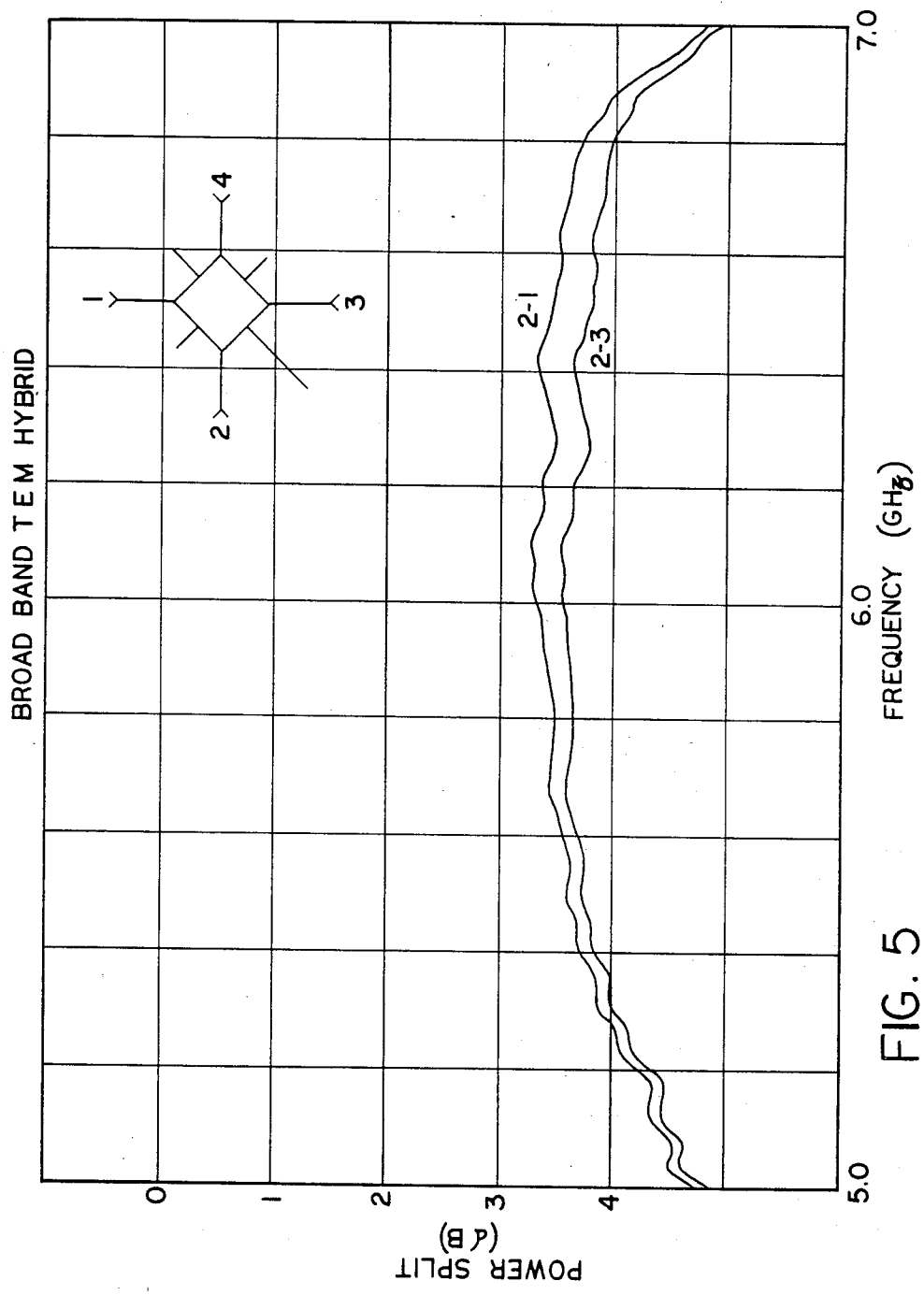

FIGS. 4 and 5 graphically illustrate the conformation of expected results in an experimental situation. These performance curves were generated in the laboratory on the embodiment shown in FIG. 2, and illustrates the performance of a broadband TEM mode hybrid at C-band frequencies but do not represent the best that can be achieved with careful control of connector interfaces at the ports and general manufacturing refinement. In FIG. 4 the first solid line curve to peak illustrates performance in isolation in decibels versus frequency in gigahertz of ports 2-4 with 1 and 3 shorted. The second solid line curve to peak illustrates ports 2-4 with 1 and 3 open. The third solid line curve to peak illustrates 2-4 and the dashed curve illustrates 1-3. FIG. 5 illustrates the power split in decibels versus the frequency in gigahertz for the embodiment of FIG. 2 for ports 2-1 and 2-3.

What is claimed is:

1. A broad-band, four-port TEM mode hybrid circuit implementable in the class of microwave transmission line which includes stripline, airstrip and microstrip, said four ports including first and second side ports, a sum port and a difference port, comprising:

a pattern of printed circuit conductive traces on a dielectric substrate associated with and spaced substantially parallel with at least one ground plane;

a first conductive trace within said pattern corresponding to said difference port, said first trace connecting at a first junction within said pattern to a first terminal of each of a pair of coupled-strip all-pass filter sections, each of said filter sections extending away from said first junction at an angle with respect to said first trace;

second and third junctions within said pattern connected respectively to the second terminals of said filter sections and to second and third conductive traces, respectively, said second and third traces corresponding to said first and second side ports, respectively;

a fourth conductive trace corresponding to said sum port and first and second conductive paths connecting at an end of each of said paths within said pattern to said fourth conductive trace to form a fourth junction, said first and second conductive paths connecting at their other ends to said second and third junctions, respectively.

2. The hybrid circuit according to claim 1 in which said coupled-strip all-pass filter sections each comprise a closely spaced pair of parallel conductive printed circuit traces shorted at their ends extending away from said first junction.

3. The hybrid according to claim 1 in which said at least one ground plane comprises first and second conductive ground planes, and in which said dielectric substrate is placed midway between said first and second conductive ground planes thereby producing an implementation in stripline medium.

4. The circuit of claim 1 wherein:
said all-pass filter sections and their connecting traces each have impedance levels designed to give a desired unequal power distribution.

5. The hybrid circuit of claim 1 in which the ends of said first terminals of said filter sections and said first and second conductive paths form a generally quadrilateral shape.

6. The hybrid circuit of claim 5 in which a first one of said coupled-strip all-pass filter sections is substantially one half wavelength long at mid-band and a second one of said pair of coupled-strip all-pass filter sections is one quarter wavelength long at mid-band, said hybrid thereby exhibiting one hundred eighty degrees of phase separation at said side ports.

7. The hybrid circuit of claim 1 in which a first one of said pair of coupled-strip all-pass filter sections is substantially one half wavelength long at mid-band and a second one of said pair of coupled-strip all-pass filter sections is one quarter wavelength long at mid-band, said hybrid thereby exhibiting one hundred eighty degrees of phase separation at said side ports.

8. The hybrid circuit according to claim 7 in which said coupled-strip all-pass filter sections each comprise a closely spaced pair of parallel conductive printed circuit traces shorted at their ends extending away from said first junction.

9. The hybrid according to claim 7 including first and second conductive ground planes, and in which said dielectric substrate is placed midway between said first and second conductive ground planes thereby producing an implementation in stripline medium.

10. The hybrid circuit according to claim 1 in which said first and second conductive paths comprise third and fourth coupled-strip all-pass filter sections.

11. The hybrid according to claim 10 in which said dielectric substrate is placed midway between first and second conductive ground planes thereby producing an implementation in stripline medium.

12. The hybrid according to claim 11 in which said conductive traces corresponding to each of said four ports extends outwardly within said pattern at substantially 0°, 90°, 180° and 270° from the center of said pattern measured in the plane of said substrate.

13. The circuit of claim 10 wherein:
said all-pass filter sections and their connecting traces each have impedance levels designed to give a desired unequal power division.

14. The hybrid circuit according to claim 10 in which said third and fourth filter sections are each one quarter wavelength long.

15. The hybrid circuit according to claim 14 in which said coupled-strip all-pass filter sections each comprise a closely spaced pair of parallel conductive printed circuit traces shorted at their ends extending away from said first junction.

16. The hybrid circuit according to claim 10 in which said coupled-strip all-pass filter sections each comprise a closely spaced pair of parallel conductive printed circuit traces shorted at their ends extending away from said first junction.

17. The hybrid according to claim 16 in which said dielectric substrate is placed midway between first and second conductive ground planes thereby producing an implementation in stripline medium.

18. The hybrid according to claim 10 in which the junction ends of said coupled-strip all-pass filter sections form the outline of a quadrilateral.

19. The hybrid according to claim 18 in which said dielectric substrate is placed midway between first and second conductive ground planes thereby producing an implementation in stripline medium.

20. The hybrid according to claim 18 in which said quadrilateral outline is that of a square of side of an odd number of quarter wavelengths at the center frequency.

21. The hybrid according to claim 20 in which said dielectric substrate is placed midway between first and second conductive ground planes thereby producing an implementation in stripline medium.

22. A four-port TEM mode 180° hybrid for microwave implementation in a pattern of printed circuit form on a dielectric substrate, comprising:
four conductive traces radiating outward from a central portion of said pattern, said traces corresponding to difference, sum, and first and second side ports;
at least two coupled-strip all-pass filter sections each in the form of printed, parallel, closely-spaced conductive traces shorted at their outward ends and associated with said central portion of said pattern in such a way that, for excitation of said difference port, said first and second side ports divide the excitation and maintain a 180° phase relationship over a broad band of frequencies.

* * * * *